H. BENTZ.
APPARATUS FOR DRYING.
APPLICATION FILED DEC. 8, 1921.
1,436,142.
Patented Nov. 21, 1922.
2 SHEETS—SHEET 1.
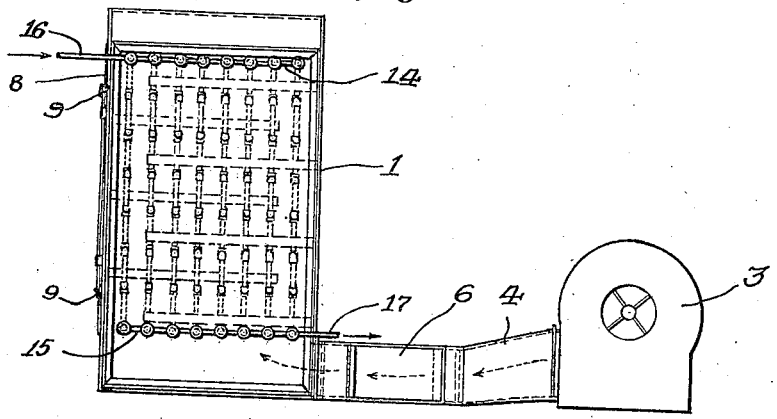
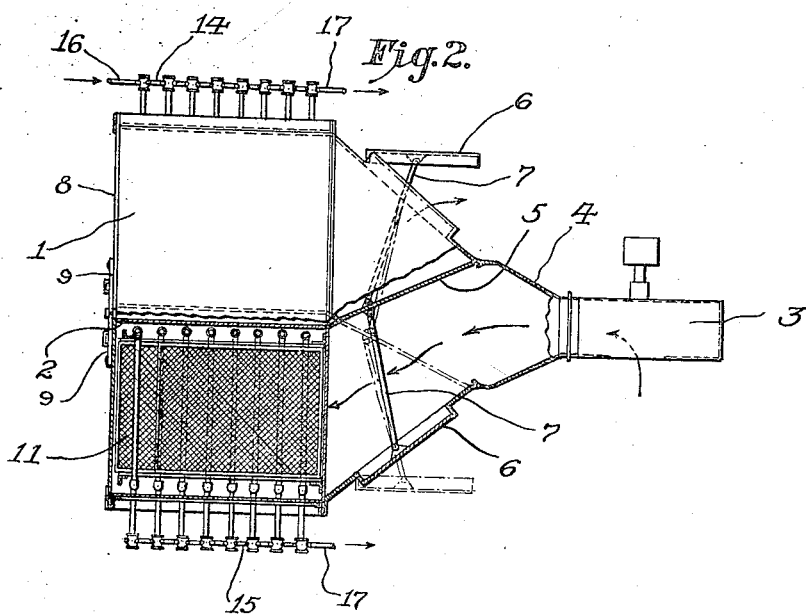
INVENTOR.
HARRY BENTZ
BY Sheffield Betts
ATTORNEYS.

H. BENTZ.
APPARATUS FOR DRYING.
APPLICATION FILED DEC. 8, 1921.
1,436,142.
Patented Nov. 21, 1922.
2 SHEETS—SHEET 2.
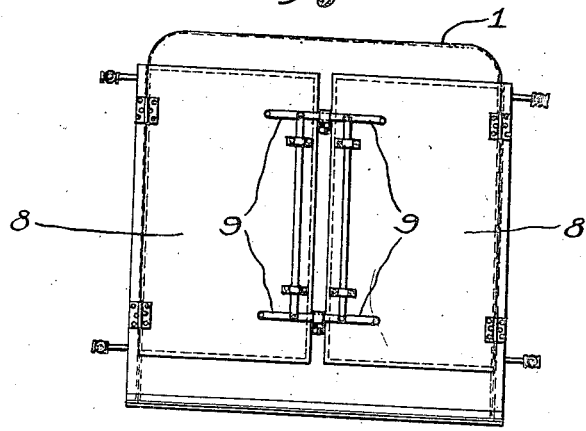
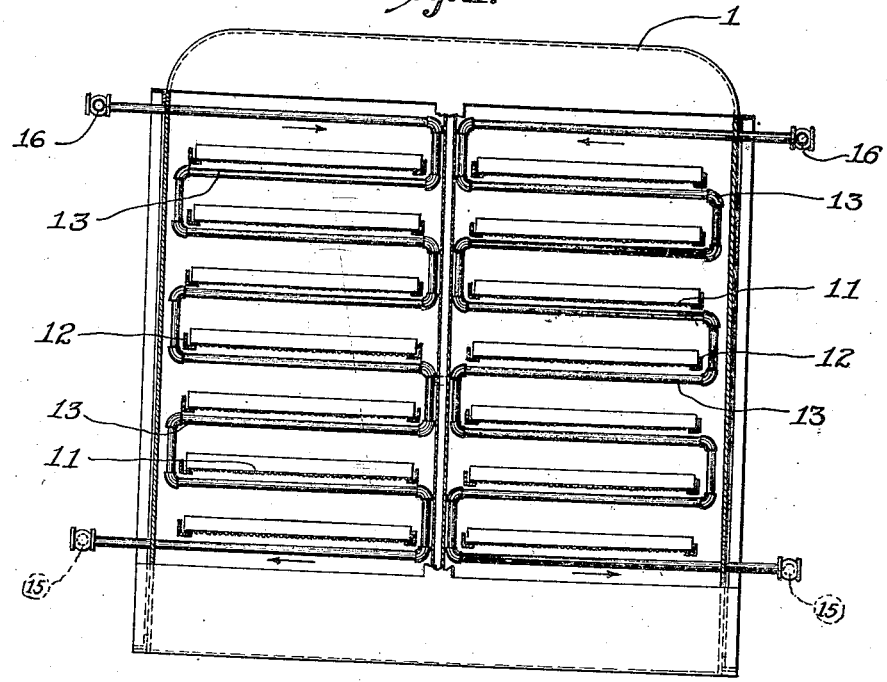
INVENTOR.
HARRY BENTZ
BY
Sheffield & Betts
ATTORNEYS.

Patented Nov. 21, 1922.

1,436,142

UNITED STATES PATENT OFFICE

HARRY BENTZ, OF MONTCLAIR, NEW JERSEY.

APPARATUS FOR DRYING.

Application filed December 8, 1921. Serial No. 520,852.

*To all whom it may concern:*

Be it known that I, HARRY BENTZ, a citizen of the United States of America, and a resident of Montclair, county of Essex, and State of New Jersey, have invented certain new and useful Improvements in Apparatus for Drying, of which the following is a description.

My invention relates to the art of drying and has as its objects the provision of simple and efficient means for drying materials at a high rate of speed and which shall give at the same time a high quality product.

The novel features of my invention are pointed out with particularity in the appended claims. The invention itself, however, with further objects and advantages, will best be understood from the following description taken with the accompanying drawing in which—

Fig. 1 is an elevation of an apparatus according to my invention.

Fig. 2 is a plan view of the apparatus illustrated in Fig. 1, parts being sectioned for purposes of illustration.

Fig. 3 is an elevation taken from the left of Fig. 1.

Fig. 4 is a view similar to Fig. 3 but having parts broken away and parts shown in section for purposes of illustration.

In the drawing, 1 is a casing having a central partition 2. Air is supplied to casing 1 by fan 3 through an air duct 4 which connects with the casing 1 at the bottom of the casing and within which is provided gate valve 5 adapted to direct air from fan 3 into the bottom of casing 1 either at one side or the other as may be desired. Doors 6, 6 in the sides of the air duct 4 serve to permit the escape of air from the casing 1 after it has passed up through the casing on one side of partitions 2 and down through the casing on the other side of said partition and back into the air duct 4 on the opposite side of the valve 5 from that on which it entered the casing. Links 7, 7, are pivoted at their ends to the valve 5 and to the doors 6 so that one door is always closed when the other is open.

The material to be dried is held in trays 11, 11 having perforated bottoms through which the air may circulate and which are supported within casing 1 by means of angle irons 12, 12 or the like.

The foregoing description applies equally well to my prior application, Serial No. 458,983, filed the 6th day of April 1921, for cabinet dryer.

According to my present invention heating means are so arranged within casing 1 that the material in the trays is, in general, between two heated elements. The material thus absorbs radiated heat and the moisture is driven out by this radiant heat and is rapidly removed by a warm air current passing over and through the material on the trays. In general, the air passes over a heating element just prior to striking each tray and naturally takes on heat progressively as it passes through the dryer. I find that by using such an arrangement and operating in the manner just described, the relative percentages of moisture in the air current and the material to be dried as well as the relative temperatures of the air and the material are automatically maintained at the points which give an exceedingly rapid drying effect with a high grade product. The volume of air passing through the dryer may be conveniently regulated to give a maximum humidity at the outlet with consequent maximum efficiency.

A convenient arrangement of heating means for the purposes just mentioned comprises steam coils 13 arranged between the trays and connected at their upper ends to inlet headers 14, 14 and at their lower ends to outlet headers 15, 15. The headers 14 have inlet pipes 16, 16 connected thereto while the headers 15 have outlet pipes 17, 17 associated therewith.

While I have illustrated and described the heating elements used according to my invention as steam coils, I do not limit myself to this type of heating element as other approved heating devices may be employed.

Having thus described my invention, I claim:

1. A drying apparatus comprising in combination a cabinet having two vertical passageways therein connected at one end, means for supporting trays in said passageways, heating elements in said passageways above and below each tray position, means for forcing gas in at one end and out at the same end of the other of said passageways, means whereby the flow of gas in said passageways may be reversed, said last means comprising a chamber communicating with both said passageways at the same end and having two apertured walls, a hinged gate within said chamber the free end of which is adapted to contact with the walls of the chamber having apertures therein, closures for said apertures, and connections between said gate and said closures whereby one closure is opened as another is closed.

2. A drying apparatus comprising in combination a cabinet having a vertical partition therein forming two passageways, said passageways being connected at the top, means for supporting trays horizontally in said passageways, steam coils above and below the tray positions in said passageways, a chamber connecting with said passageways at the bottom, said partition projecting into said chamber, a gate hinged to said projecting portion and adapted to swing into contact with the walls of said chamber whereby air is directed into one or the other of said passageways said chamber having apertures therein, closures for said apertures, and connections between said gate and said closures whereby the closures are moved by said gate to open one aperture as the other one is closed.

HARRY BENTZ.